United States Patent [19]

Kuwayama et al.

[11] Patent Number: 4,720,158

[45] Date of Patent: Jan. 19, 1988

[54] METHOD OF AND APPARATUS FOR MAKING A HOLOGRAM

[75] Inventors: Tetsuro Kuwayama, Yokohama; Yasuo Nakamura, Tokyo, both of Japan

[73] Assignees: Canon Kabushiki Kaisha; Canon Denshi Kabushiki Kaisha, both of Tokyo, Japan

[21] Appl. No.: 678,592

[22] Filed: Dec. 5, 1984

[30] Foreign Application Priority Data

Dec. 7, 1983 [JP] Japan ................... 58-229835
Dec. 7, 1983 [JP] Japan ................... 58-229836

[51] Int. Cl.$^4$ ............................... G03H 1/22
[52] U.S. Cl. ...................... 350/3.69; 350/3.7; 350/3.75
[58] Field of Search ............ 350/3.69, 3.70, 3.71, 350/3.72, 3.73, 162.2, 3.78, 3.75, 3.76

[56] References Cited

U.S. PATENT DOCUMENTS

| | | | |
|---|---|---|---|
| 4,253,723 | 3/1981 | Kojima et al. | 350/3.72 |
| 4,458,980 | 7/1984 | Ohki et al. | 350/3.73 |
| 4,547,037 | 10/1985 | Case | 350/3.69 |

OTHER PUBLICATIONS

Roosen et al., *IBM Technical Disclosure Bulletin*, vol. 26, No. 6, p. 2929, Nov. 1983.

*Primary Examiner*—Bruce Y. Arnold
*Assistant Examiner*—Martin Lerner
*Attorney, Agent, or Firm*—Fitzpatrick, Cella, Harper & Scinto

[57] ABSTRACT

In a method of making a hologram by causing a plurality of light beams to interfere with one another, a new hologram is made by the use of the reproduced lights from a plurality of holograms made on the same substrate.

3 Claims, 9 Drawing Figures

METHOD OF AND APPARATUS FOR MAKING A HOLOGRAM

BACKGROUND OF THE INVENTION

1. Field of the Invention

This invention relates to a method of and an apparatus for making a hologram.

2. Description of the Prior Art

A hologram lens can be obtained by making the hologram of a point source of light by the use of the holography technique. The hologram lens has the advantage that it is a thin film lens of planar shape having a thickness of several microns and can be mass-produced on the same planar plate by the step-and-repeat method. Therefore, it has been proposed to utilize the hologram lens as the optical element in an optical system utilizing a laser light, such as the condensing lens of the optical head of an optical disc device or a collimation lens for converting the divergent light beam from a semiconductor laser into a parallel light beam.

In the optical system of the optical head unit of the optical disc device, a light-condensing hologram lens is disposed on the surface of a disc substrate so as to read signals recorded on the back of a plastic plate having a thickness of about 1.1 mm. The hologram lens is disposed with an air space of the order of 1 mm with respect to the disc substrate so that it may not collide against the disc substrate due to vibration of the disc, and a cover glass or protective layer of a suitable thickness is interposed therebetween to prevent adherence of dust or the like to the hologram lens.

A hologram lens making optical system used in such an optical system is shown in FIG. 1 of the accompanying drawings. In FIG. 1, part of a monochromatic light emitted from a laser light source 1 is transmitted through a half-mirror 3, is reflected by a reflecting mirror 4, and is condensed into a pin-hole 16 by a microscope objective lens 15, and the light transmitted through the pin-hole 16 is transmitted through a collimation lens 17 and becomes a parallel light beam 18, which is transmitted through parallel flat plate 9 and enters a hologram sensitive material 11 applied to a hologram substrate 10. This is a reference light. On the other hand, the light beam reflected by the half-mirror 3 is reflected by a reflecting mirror 5 and is condensed into a pin-hole 8 by a microscope objective lens 7, and the light transmitted through the pin-hole 8 becomes a divergent light beam 12, which is transmitted through the parallel flat plate 9 and enters the hologram sensitive material 11. This is an object light. The object light beam 12 is made into a divergent light beam having spherical aberration by the parallel flat plate 9, and this light beam and the reference light beam form interference fringes at the position of the hologram sensitive material 11, and these interference fringes are recorded on the hologram sensitive material 11. By developing this, there is obtained a hologram lens.

Where the hologram lens thus made is used, a laser light of the same wavelength as that used during the making of the hologram lens is caused to enter the hologram 11 as a parallel light beam at the same angle as the parallel light beam 18 but in the opposite direction. The light diffracted by the hologram 11 becomes a convergent light beam having the spherical aberration imparted to the object light during the making and, after this light beam has been transmitted through the cover glass and the disc substrate, a light spot is created at a position corresponding to the pin-hole 8 during the making of the hologram.

Thus, by using a light of the same wavelength during the making and during the use, complete wave surface reproduction can be accomplished substantially without aberrations by the hologram lens.

Particularly, where a volume type phase hologram is made by using bichromate gelatine as the hologram sensitive material 11, the diffraction efficiency of the hologram can be enhanced to about 100% and the utilization efficiency of light is of an acceptable value.

Now, as the light source in an optical system using a hologram, it is preferable to use a compact, light-weight semiconductor laser which does not require any special modulator. The oscillation wavelength range of such a semiconductor laser is usually from the near infrared range to the infrared range (0.78 $\mu$m or more). Accordingly, where the making of the hologram lens as described above and the image reproduction using it is effected by the use of such semiconductor laser, it is necessary that use be made of a hologram sensitive material having the effective sensitivity in 0.78 $\mu$m or more. As a hologram sensitive material having sensitivity in this wavelength range, there is a silver salt sensitive material sensitized by infrared light. However, a hologram made by the use of such sensitive material is an absorption type hologram and therefore, it has a disadvantage that its diffraction efficiency is as low as several %. Also, the diffraction efficiency can be improved to some degree as by bleaching such hologram, but there is a limit to this.

Accordingly, to improve the diffraction efficiency, it is necessary to adopt a volume type phase hologram. Bichromate gelatine is typical as the sensitive material used for the making of such a hologram. However, this sensitive material is such that its effective sensitivity area is up to green light of maximum 0.55 $\mu$m. Even if special coloring matter sensitization is applied thereto, it is merely possible to endow it with sensitivity up to red light of 0.6 $\mu$m. Further, sensitive material for volume type holograms having an effective sensitivity in the near infrared range and the infrared range is not yet known.

Therefore, a semiconductor laser cannot be used during the making of a volume type phase hologram. Instead, use is made of a laser having a shorter wavelength. When a hologram thus made is used in an optical system using a semiconductor laser, the wavelength of light differs during the making and during the use. Therefore, imaging does not occur without aberrations and accordingly, in some cases, aberration correction becomes necessary. Where the making of a hologram is effected with aberrations being pre-imparted to the forming light beam with the aberrations resulting from the difference in wavelength between the radiation during its use being taken into account, it then is necessary to make a reference wave and an object wave by the use of independent optical systems and to dispose them in a predetermined space. Thus, the placement accuracy of the hologram making optical system is very critical. Where many holograms are to be made by the making optical system of which such critical placement accuracy is required, if the optical system deviates from its predetermined setting due to the vibration from the environment re-setting will be required each time such deviation occurs. Accordingly, it is not desirable to mass-produce holograms by the use of such an optical system.

The foregoing description has been made of a hologram lens for condensing a parallel light beam at a point. Another difficulty occurs for hologram lens for converting a divergent light beam into a convergent light beam. FIG. 2 of the accompanying drawings shows an optical system for making a hologram lens for condensing a light beam diverging from a point at another point. In FIG. 2, it is necessary that a reference light beam 18 converge at a point 20 in the air without aberrations after it has emerged from a hologram substrate 10. However, since this light beam 18 passes through a parallel flat plate 9 and hologram substrate 10, aberrations occur due to these optical elements to negate these aberrations, it is necessary to provide a single lens 17 and a cylindrical lens 17' obliquely with respect to the optic axis on this side of the parallel flat plate 9, for example. Actually, however, it is quite difficult to design such an optical system, make these optical elements and arrange them accurately. Accordingly, such an optical system is not suitable as the means for mass-producing hologram lenses.

Further, in the hologram making optical systems as shown in FIGS. 1 and 2, the parallel flat plate 9 is disposed immediately forward of the hologram sensitive material 11, and this results in creation of harmful ghost images. That is, light beam 13 which results from part of the object wave light beam 12 being reflected by the second surface and then by the first surface of the parallel flat plate 9 and a light beam 13' generated from part of the object wave light beam 12 being reflected by the surface of the hologram sensitive material 11 and thereafter the second surface of the parallel flat plate 9 enter the hologram sensitive material 11. Harmful ghost images are recorded. These ghost images are reproduced during the use of the hologram lens and may result in creation of unnecessary ghost light and reduction in diffraction efficiency.

SUMMARY OF THE INVENTION

In view of the prior art as described above, the present invention intends to provide a method of and an apparatus for making a hologram which can be carried out by a simple apparatus and which do not particularly require strict placement.

Another object of the present invention is to provide a method of making a hologram which is capable of effecting substantially aberration-free reproduction of high diffraction efficiency in a case where the wavelength of light during the making of the hologram and the wavelength of light during the use of the hologram differ from each other.

Still another object of the present invention is to provide a hologram making apparatus which can make a hologram free of harmful ghost images.

In the hologram making method according to the present invention, the above objects are achieved by obtaining an object light beam and a reference light beam for forming a hologram by illuminating holograms formed on the same substrate.

DESCRIPTION OF THE PREFERRED EMBODIMENTS

Before describing the substance of the present invention, the principle of Bragg diffraction will hereinafter be described by reference to FIGS. 3A and 3B and it will also be described that even when the wavelength of light during the making of a volume type hologram differs from the wavelength of light during the use of such hologram, a hologram which can satisfy the Bragg conditions relative to the light of the wavelength during its use can be made.

Figure 1:
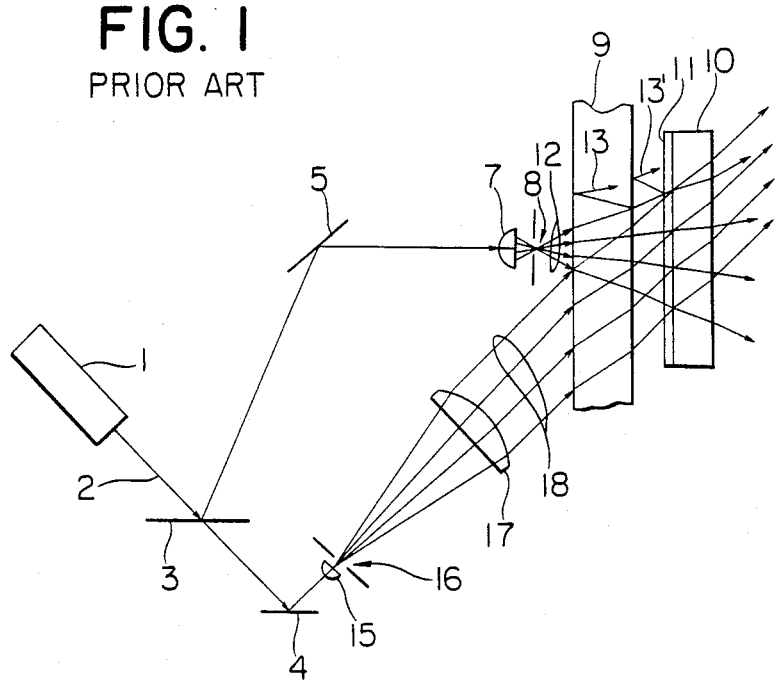
FIGS. 1 and 2 show the hologram making optical systems according to the prior art.
Figure 2:
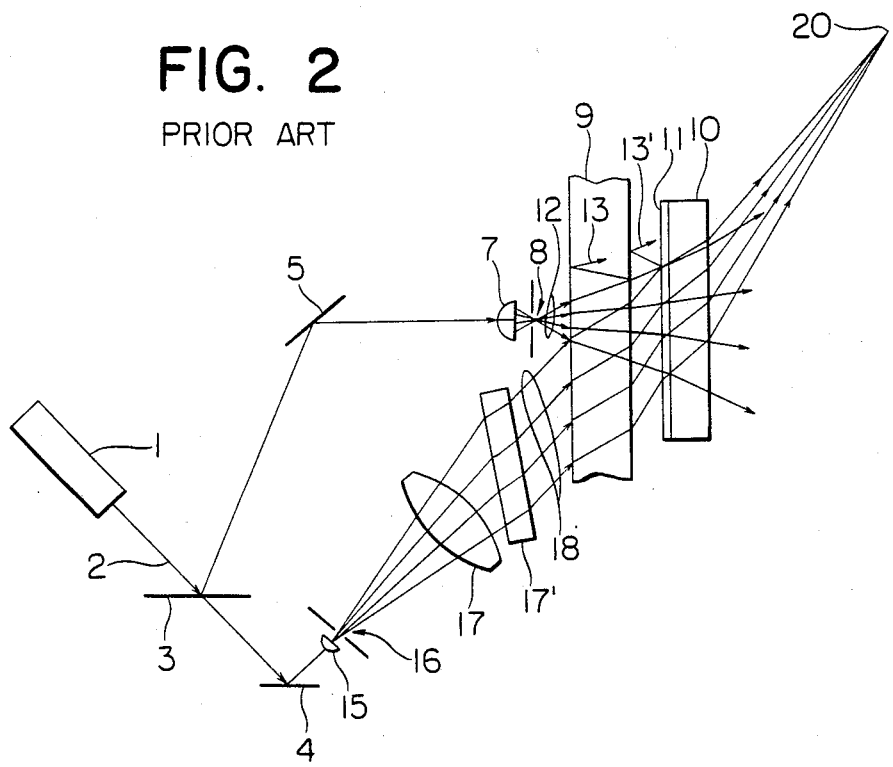
Figure 3A:
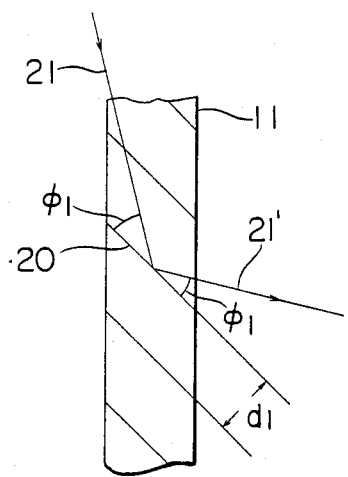
FIG. 3A shows the Bragg diffraction of light by a hologram.
Figure 3B:
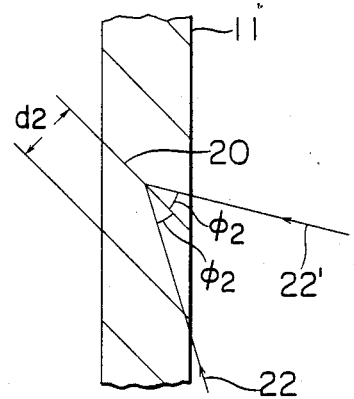
FIG. 3B shows the making of a hologram by interference of light.

FIG. 3A shows the Bragg diffraction at the wavelength $\lambda_1$ during the use of a hologram 11. In FIG. 3A, a light ray 21 having entered an interference fringe 20 of pitch $d_1$ at an angle $\phi_1$ becomes a light ray 21' emerging at an angle $\phi_1$ relative to the interference fringe as a result of diffraction when the Bragg conditions are satisfied. The relation in this case may be expressed as $$2d_1 \sin \phi_1 = \lambda_1/N_1 \quad (1),$$

where $N_1$ is the refractive index of the hologram sensitive material at a wavelength $\lambda_1$.

To make interference fringes which satisfy equation (1) by the use of a light of wavelength $\lambda_2$ different from the wavelength $\lambda_1$ during the use, the light may be caused to enter at an angle $\phi_2$ which satisfies $$2d_2 \sin \phi_2 = \lambda_2/N_2 \quad (2),$$

where $N_2$ is the refractive index of the hologram sensitive material at the wavelength $\lambda_2$. The state thereof is shown in FIG. 3B. It is because the variation in the dimensions of the sensitive material during the development of the hologram has been taken into account that the pitch of the interference fringes during the making is $d_2$ different from the pitch $d_1$ during the use. Accordingly, in the hologram made in the manner shown in FIG. 3B, the pitch of the interference fringes becomes $d_1$ after the development as shown in FIG. 3A. If, as shown in FIG. 3B, light rays 22 and 22' are caused to enter at an angle $\phi_2$ from two directions to form the interference fringes 20, there will be obtained a hologram having interference fringes which will satisfy the Bragg conditions during use. There is a particular relation between $d_1$ and $d_2$ in equations (1) and (2), and assuming for simplicity that $d_1 = d_2$, from equations (1) and (2), $\phi_2$ is determined so as to satisfy $$\sin \phi_2 = \{(\lambda_2/N_2)/(\lambda_1/N_1)\} \sin \phi_1 \quad (3).$$

Also, $|\sin \phi_2| \leq 1$ and therefore, assuming that $\mu = (\lambda_2/N_2)/(\lambda_1/N_1)$, it is necessary that $|\mu \cdot \sin \phi_1| \leq 1$ be satisfied.

As described above, even when the wavelength of the light during the use of the hologram differs from the wavelength of the light during the making of the hologram, a hologram which satisfies the Bragg conditions at each point during the use and can create a diffracted light in a predetermined direction can be made. This is done by causing two light beams to enter each point of the hologram sensitive material from appropriate directions during the making of the hologram.

A specific embodiment of the present invention will hereinafter be described.

Figure 4:
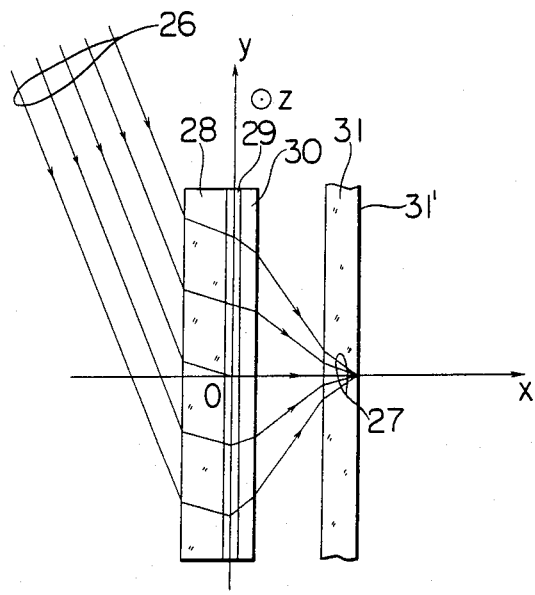
FIG. 4 shows the optical system during the use of a hologram lens.

FIG. 4 shows the optical system when a hologram lens is used in the optical head portion of an optical disc device. In FIG. 4, a parallel light beam 26 of wavelength $\lambda_1$ enters a hologram substrate 28, is diffracted by about 100% by a hologram 29, passes through a cover glass or protective film 30 into the air, becomes a converged light beam 27 and is condensed on the back 31' of a disc 31.

Figure 5:
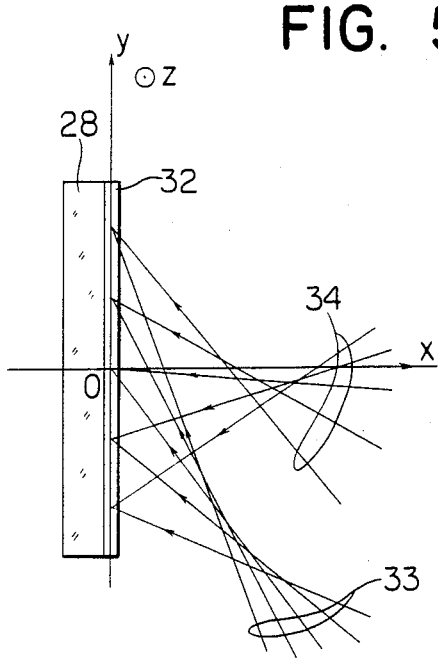
FIGS. 5 and 6 show an embodiment of the optical system during the making of hologram lens.

FIG. 5 shows an optical system for making a hologram lens used in the optical system of FIG. 4. In FIG. 5, a reference wave light beam 33 of wavelength $\lambda_2$ and an object wave light beam 34 are caused to enter a hologram sensitive material 32. The reference wave light beam 33 and the object wave light beam 34 are determined so as to obtain a hologram which can condense these light beams substantially without aberrations by the diffraction as shown in FIG. 4 during the use of the hologram in accordance with the principle as described above. In order to obtain such light beams 33 and 34, a substrate on which two types of holograms are formed (such substrate will hereinafter be referred to as the master hologram plate) is used in the present invention. As methods of making different holograms on a single substrate, there is, for example, a method of making holograms by the use of an optical system, a method of making holograms by the use of a computer or a method comprising a combination of these two methods. In the following discussion the description refers to use of a computer hologram (hereinafter referred to as CGH) made by the use of a computer.

To make CGH, a method has heretofore been adopted in which enlarged holograms by an X-Y plotter are made and optically reduced and exposed to light. However, using this method, errors, such as the error of the optical system and the error of the arrangement thereof have imparted on the reducing process and particularly, in holograms of high NA, it has been impossible to obtain CGH having satisfactory performance. However, with the recent improvements in the semiconductor integrated circuit fabrication making technique, it has become possible to effect minute working by the electron beam exposure (EB exposure) method. If this EB exposure method is used, a minute pattern can be formed on a hologram sensitive material and the reduction using an optical system becomes unnecessary and therefore, CGH of high performance can be obtained. As the sensitive material for EB exposure CGH, there is poly-methyl methacrylate (p-MMA), poly-methacrylic acid anhydride (p-MA . AN) or the like. A grating of sub-micron line width can be made from such material.

Figure 6:
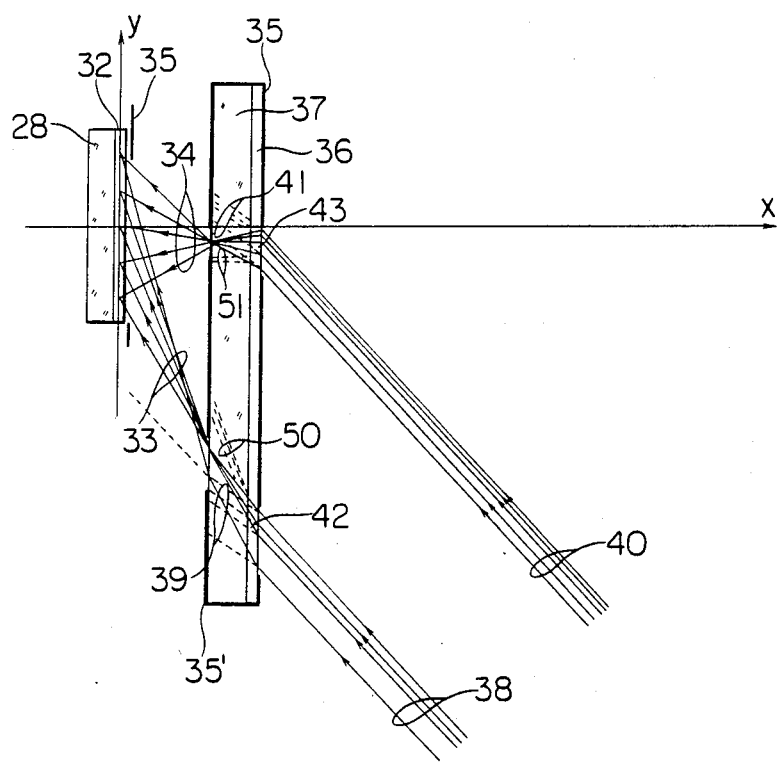

A master hologram plate capable of forming the intended light beam can be made by using such CGH. An embodiment of the hologram making optical system using the master hologram plate formed by such CGH is shown in FIG. 6. In FIG. 6, reference numerals 38 and 40 designate parts of the light beam from a laser light source collimated by the use of a beam expander or the like. They enter holograms 42 and 43, respectively, made on a substrate 37. These two parallel light beams 38 and 40 are parts of a parallel light beam, the parallel light beam 38 representing a light beam entering a hologram 42 as a reference wave and the parallel light beam 40 representing a light beam entering a hologram 43 as an object wave. A part of the light beam having entered the hologram 42 as a reference wave becomes a transmitted light beam 39 and the other part of said light beam is primarily diffracted and becomes a reference wave light beam 33. Likewise, a part of the light beam having entered the hologram 43 as the object wave becomes a transmitted light beam 41 and the other part of said light beam is primarily diffracted and becomes an object wave light beam 34. Interference fringes formed in the hologram sensitive material 32 on the hologram substrate 28 by the reference wave light beam 33 and the object wave light beam 34 are recorded. Reference numeral 35 designates a mask for causing a light beam to enter only a predetermined portion of the hologram 36 or the hologram sensitive material 32. Reference numeral 35' denotes a mask provided on a substrate 37 to intercept unnecessary transmitted light beams 39 and 41 and high-order diffracted light beams 50 and 51 created from the hologram 42 as reference wave and the hologram as the object wave. Accordingly, the unnecessary light does not reach the hologram sensitive material 32.

The necessary grating pitch of the hologram and the direction thereof can be determined by a grating equation. If (i) the x-axis is taken in a direction perpendicular to the surface of the hologram and (ii) the y-axis and the z-axis are taken in directions in the surface of the hologram and (iii) the direction cosines of the incident light beam and the emergent light beam are $l_1$, $m_1$, $n_1$ and $l_2$, $m_2$, $n_2$, respectively, and (iv) the pitches of the grating in y-direction and z-direction are $P_y$ and $P_z$, respectively, then the following relations are established:

$$P_y = \lambda_c/(m_2 - m_1) \qquad (4)$$

$$P_z = \lambda_c/(n_2 - n_1) \qquad (5)$$

where $\lambda_c$ is the wavelength of the laser light. The grating pitch at each point on the hologram is determined by equations (4) and (5). This grating pitch can be calculated with respect to any point on the hologram, and this is the necessary form of the hologram when a group of curves smoothly combined as entire hologram is considered.

According to the embodiment of the present invention as described above, the unnecessary diffracted invention as described above, the light from CGH can be intercepted by the mask 35' and therefore, ghost images can be removed. In addtion, there is obtained an advantage that the degree of freedom of the arrangement of the optical system increases. That is, the angle formed between the high-order diffracted light and the 1st-order diffracted light is proportional to the angle formed between the 0-order transmitted light and the 1st-order diffracted light and therefore, to prevent the unnecessary high-order diffracted light from entering the hologram sensitive material, the angle formed between the 0-order transmitted light and the 1st-order diffracted light may be made as great as possible. However, for this purpose, the grating pitch of CGH must be made very small, and this may result in reduced diffraction efficiency and increased depiction time during the making of CGH. Thus, as in the above-described embodiment, the high-order diffracted light can be intercepted by providing the mask 35' and therefore, the grating pitch of CGH may be great and the arrangement of CGH also becomes considerably free.

Figure 7:
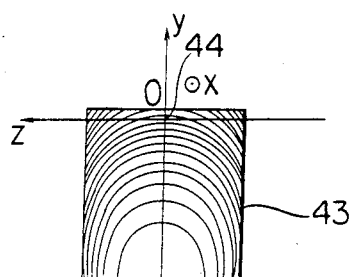
FIG. 7 is a plan view of a computer hologram used in the optical system of FIG. 6.

FIG. 7 shows the hologram 36 used in the optical system of FIG. 6 as it is observed from the direction of the x-axis. Reference numeral 44 designates the origin of the coordinates, and hologram for reference numerals 42 and 43 denote the hologram for use as reference wave and the hologram for use as the object wave, respectively. These holograms are used when incident light beams 38 and 40 of wavelength 0.488 μm are caused to enter at an incident angle of 40° in the forming optical system as shown in FIG. 6 in order to make the hologram 29 used with the incident parallel light beam 26 of wavelength 0.78 μm being caused to enter at an incident angle 75° in the optical system as shown in FIG. 4. In this example of the design, the hologram 43 for object wave is such that the pitch of the grating is 0.6–130 μm, the number of lines is 5000 and the size of the grating is 4×4 mm, and the hologram 42 for reference wave is such that the pitch of the grating is 1.7–6 μm, the number of lines is 5600 and the size of the grating is 12×1.4 mm, and all of these numerical values can be achieved by the CGH by the EB exposure.

Description will now be made of the arrangement accuracy of the hologram making optical system according to the embodiment of the present invention as described above. Calculating the arrangement accuracy of such a hologram making optical system that in the hologram using state (FIG. 4), the wave surface aberration is λ/4 (λ is the wavelength of the light during the use) or less in the NA used, the relative arrangement accuracy of CGH and the hologram sensitive material may be ±100 μm with the wavelength of the light during use and the wavelength of the light during production being 0.78 μm and 0.488 μm, respectively. Further, in the present embodiment, CGH for the object wave and CGH for the reference wave are made on the same substrate and therefore, in principle, no arrangement error occurs therebetween. In contrast, where use is made of an optical system for object wave and an optical system for reference wave which are independent of each other, the relative arrangement accuracy of these optical systems must be ±30 μm and the relative surface fall thereof must be ±3', and the relative arrangement accuracy of these optical systems and the hologram sensitive material must be ±30 μm.

A further embodiment of the hologram making optical system according to the present invention will now be shown.

Figure 8:
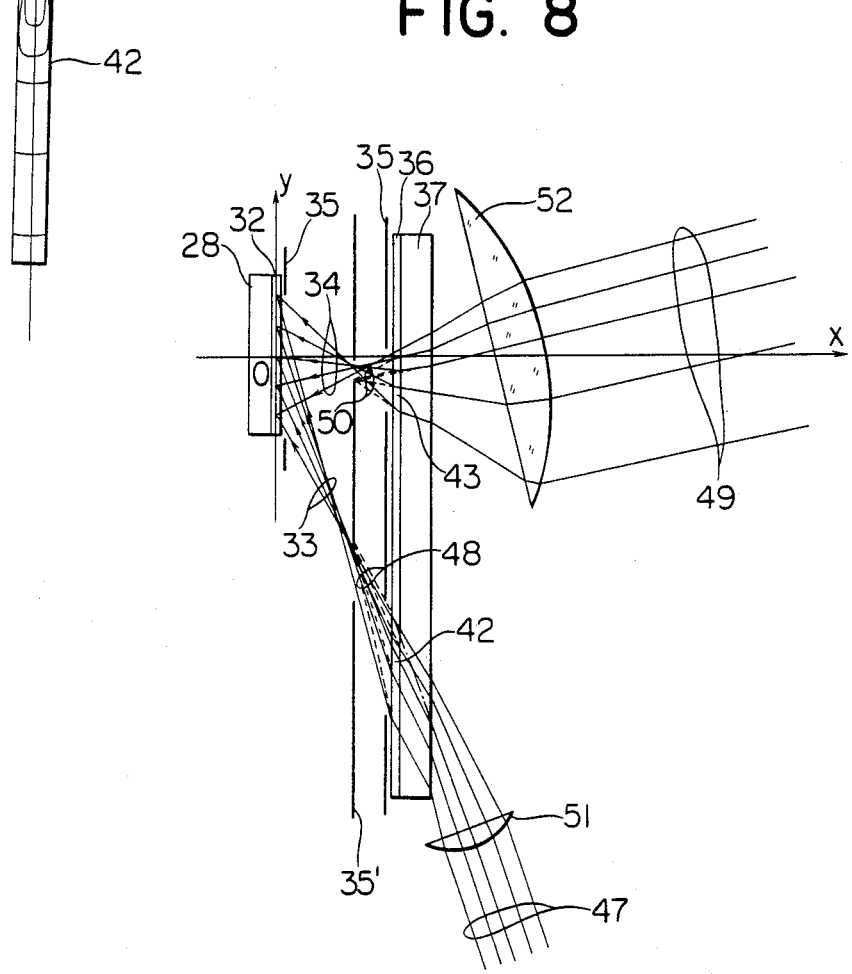
FIG. 8 shows another embodiment of the hologram making optical system according to the present invention.

The minimum pitch of the grating of CGH is created at a point whereat the 0-order transmitted light and the 1st-order diffracted light form the greatest angle therebetween. Therefore, to increase the minimum pitch, use may be made of such an optical system such that the 1st-order diffraction angle at the lower edge portion of the CGH 42 for reference wave in FIG. 6 is small and the 1st-order diffraction angle at the upper edge portion of the CGH 43 for object wave is made small. An example of such optical system is shown in FIG. 8. In FIG. 8, the incident light beam 47 is converged by the use of condensing lens 51 and enters the CGH 42 for reference wave, and the 0-order transmitted light beam 48 thereof is condensed on and intercepted by the surface of a mask 35', and only the 1st-order diffracted light beam 33 as a reference light enters the hologram sensitive material 32. Likewise, the incident light beam 49 is converged by the use of a condensing lens 52 and enters the CGH 43 for object wave, and the 0-order transmitted light beam 50 thereof is condensed on and intercepted by the surface of the mask 35'. Only the 1st-order diffracted light beam 34 as an object light enters the hologram sensitive material 32. Thus, the ghost images will not be recorded even if the grating pitch is made large over the whole surfaces of CGH 42 and CGH 43 and the angle formed between the 0-order transmitted light and the 1st-order diffracted light is made small.

Thus, according to the present embodiment, use can be made of CGH having uniform and relatively great pitch over the whole surface thereof and therefore, in the making CGH, the depiction time is shortened and the making of CGH becomes moreover, the diffraction efficiency of CGH is improved and the diffraction efficiency is uniformized over the whole surface of CGH, and this is very advantageous for the making of a hologram.

In the foregoing embodiments, description has been made of a case where two CGH's are arragned on the same substrate. By repetitiveiy applying the above-described method, numerous sets of two CGH's can be arranged on the same substrate and if this arrangement is used, a number of holograms can be made by one cycle of holography exposure.

While the embodiment in which a master hologram plate is formed by a computer hologram has been described above, the master hologram plate can of course be formed by the use of an optical system. Forming a master hologram plate and thereby forming a further hologram leads to many advantages. For example, where light beams having respective aberrations are made by the utilization of the off-axis aberration of an ordinary spherical lens system, the accuracy necessary for the arrangement of these lenses must be ±30 μm or more as previously described. Let it be assumed that the setting of the lens system has been accomplished with high accuracy by the use of a very accurate measuring machine or measuring technique and that mass production of hologram lenses has been achieved by the use of this lens system. If the arrangement of the lens system is changed only slightly at this time, undesired aberrations will be created in the resultant lens. Accordingly, this optical forming system must be completely shielded from extraneous vibration and thermal deformation the deformation which results from variation with time must be completely prevented. Also, when hologram lenses are to be mass-produced, it is necessary to provide a plurality of sets of making optical systems and making the hologram lenses in a juxtaposed manner. For this purpose, a plurality of sets of optical systems adjusted highly accurately will become necessary. The above-noted problem can be solved by forming a set of master hologram plates made on the same substrate. A master hologram plate has a plurality of holograms made on a single substrate and therefore, the relative position of the holograms is invariable. Also, a master hologram plate is dimensionally stable and no fine adjustment is required during the mass production of hologram lenses. If a master hologram plate is made, a plurality of master hologram plates can be easily made from this master hologram plate by intimate contact copying. A similar advantage occurs even where the optical system for making this master hologram plate is a non-spherical lens or a rotation-asymmetric non-spherical lens. That is, these non-spherical lenses are difficult to work and it is difficult to obtain a number of such lenses just identical to one another. In contrast, by reproducing a master hologram plate plural times, there is obtained the same effect as that of obtaining a number of non-spherical lenses equivalently.

What we claimed is:

1. A method of making a hologram comprising the steps of:
    forming a first hologram for producing an object light beam and a second hologram for producing a reference light beam on the same plane of a plane substrate; and
    illuminating said first and second holograms formed on said same plane of the plane substrate and forming a third hologram by the light beams from said two holograms.

2. An optical system for making a hologram comprising:
    a master hologram plate having a first hologram for producing an object light beam and a second hologram for producing a reference light beam formed on the same plane of a plane substrate; and
    illuminating means for illuminating the holograms on said master hologram plate.

3. An optical system for making a hologram comprising:
    a master hologram plate having a first hologram for producing an object light beam and a second hologram for producing a reference light beam formed on the same substrate;
    illuminating means for illuminating the hologram on said master hologram plate; and
    means for intercepting undesired transmitted and diffracted light produced by the holograms on said master hologram plate so as not to enter into the third hologram, when the holograms of the master hologram plate are illuminated.

* * * * *